(12) United States Patent
Wang et al.

(10) Patent No.: US 12,426,033 B2
(45) Date of Patent: Sep. 23, 2025

(54) UNIFYING SIDELINK AND UU INTERFACE DOWNLINK CONTROL INFORMATION

(71) Applicant: QUALCOMM Incorporated, San Diego, CA (US)

(72) Inventors: Xiaojie Wang, Hillsborough, NJ (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 800 days.

(21) Appl. No.: 17/652,198

(22) Filed: Feb. 23, 2022

(65) Prior Publication Data
US 2023/0269724 A1    Aug. 24, 2023

(51) Int. Cl.
*H04W 72/1263* (2023.01)
*H04L 1/00* (2006.01)
*H04W 72/23* (2023.01)
*H04W 92/18* (2009.01)

(52) U.S. Cl.
CPC ....... *H04W 72/1263* (2013.01); *H04L 1/0025* (2013.01); *H04W 72/23* (2023.01); *H04W 92/18* (2013.01)

(58) Field of Classification Search
CPC . H04W 72/1263; H04W 72/23; H04W 92/18; H04W 72/044; H04L 1/0025; H04L 1/0003; H04L 1/0009; H04L 1/0061
See application file for complete search history.

(56) References Cited

U.S. PATENT DOCUMENTS

| | | | |
|---|---|---|---|
| 2015/0110038 A1* | 4/2015 | Yang | H04L 1/0061 370/329 |
| 2015/0319724 A1* | 11/2015 | Chae | H04W 8/005 370/315 |
| 2016/0219636 A1* | 7/2016 | Fujishiro | H04W 76/14 |
| 2016/0278053 A1* | 9/2016 | Lee | H04L 5/0048 |
| 2017/0245313 A1* | 8/2017 | Kim | H04L 1/1671 |
| 2017/0290046 A1* | 10/2017 | Sun | H04W 72/0466 |
| 2019/0150187 A1* | 5/2019 | Park | H04L 5/0094 370/330 |
| 2019/0182639 A1* | 6/2019 | Basu Mallick | H04W 72/23 |
| 2019/0363843 A1* | 11/2019 | Gordaychik | H04W 72/044 |
| 2020/0120645 A1* | 4/2020 | Park | H04L 5/0048 |
| 2020/0396760 A1* | 12/2020 | Yi | H04L 1/1812 |
| 2021/0028891 A1* | 1/2021 | Zhou | H04W 4/40 |
| 2021/0352707 A1* | 11/2021 | Maaref | H04L 1/0072 |
| 2022/0210800 A1* | 6/2022 | Babaei | H04L 5/0092 |
| 2022/0287052 A1* | 9/2022 | Hwang | H04W 72/1263 |

* cited by examiner

*Primary Examiner* — Michael K Phillips
(74) *Attorney, Agent, or Firm* — Harrity & Harrity

(57) ABSTRACT

Various aspects of the present disclosure generally relate to wireless communication. In some aspects, a user equipment (UE) may receive, from a network node, scheduling information scheduling one or more communications. The one or more communications may be scheduled over one or more of a sidelink, an uplink, or a downlink. The scheduling information may provide one or more of a transmission parameter for the one or more communications or a reception parameter for the one or more communications. The UE may communicate the one or more communications based at least in part on the one or more of the transmission parameter or the reception parameter. Numerous other aspects are described.

30 Claims, 10 Drawing Sheets

700 ⟶

710 — Receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications 720 — Communicate the one or more communications based at least in part on the one or more of the transmission parameter or the reception parameter

UNIFYING SIDELINK AND UU INTERFACE DOWNLINK CONTROL INFORMATION

FIELD OF THE DISCLOSURE

Aspects of the present disclosure generally relate to wireless communication and to techniques and apparatuses for unifying sidelink and Uu interface downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
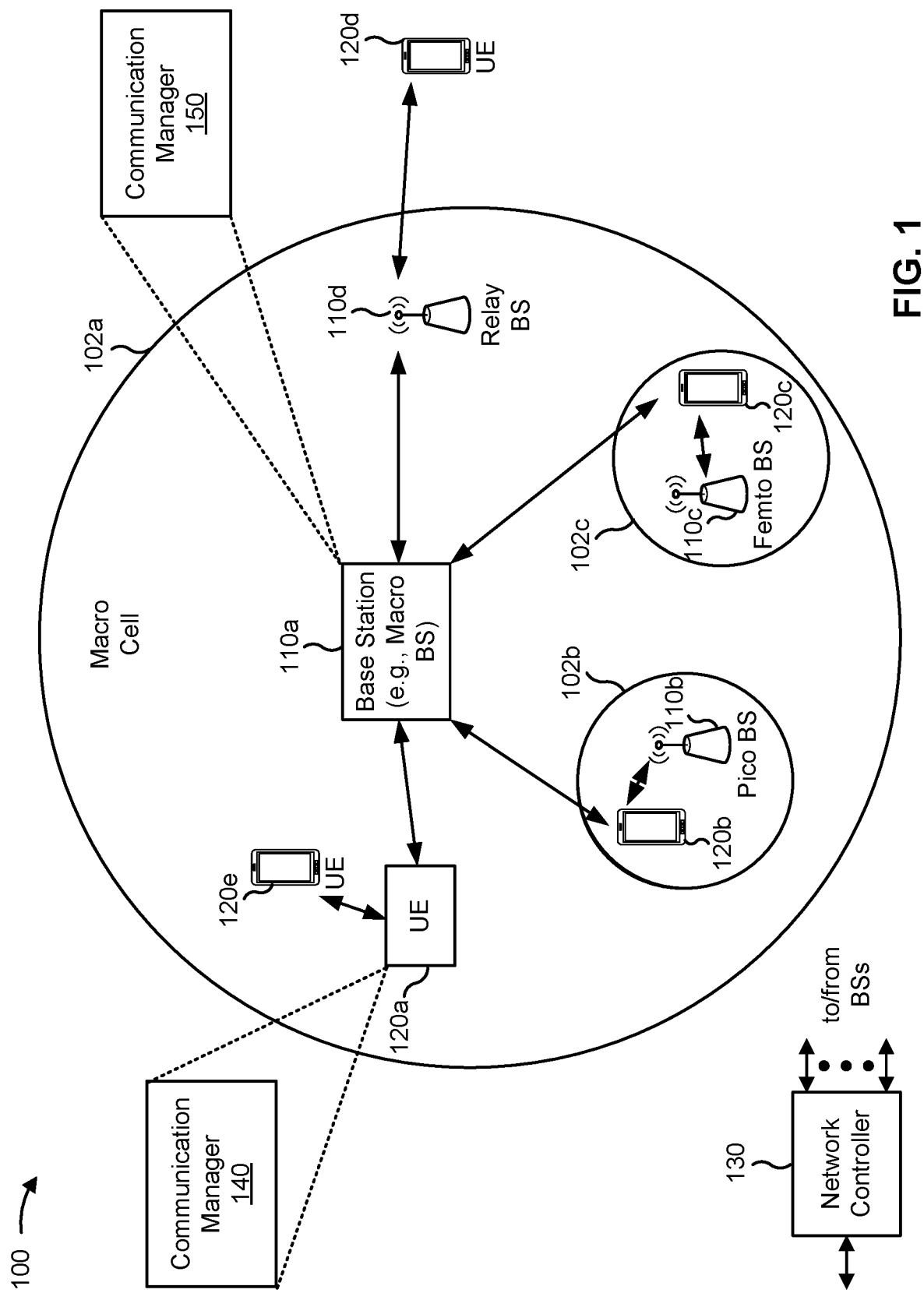
FIG. 1 is a diagram illustrating an example of a wireless network, in accordance with the present disclosure.

Some aspects described herein relate to a method of wireless communication performed by a user equipment (UE). The method may include receiving, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications. The method may include communicating the one or more communications based at least in part on the one or more of the transmission parameter or the reception parameter.

Some aspects described herein relate to a method of wireless communication performed by a network node. The method may include transmitting scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications. The method may include communicating the one or more communications based at least in part on the one or more of the transmission parameters or the reception parameters.

Some aspects described herein relate to a UE for wireless communication. The UE may include a memory and one or more processors coupled to the memory. The one or more processors may be configured to receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications. The one or more processors may be configured to communicate the one or more communications based at least in part on the one or more of the transmission parameter or the reception parameter.

Some aspects described herein relate to a network node for wireless communication. The network node may include a memory and one or more processors coupled to the memory. The one or more processors may be configured to transmit scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications. The one or more processors may be configured to communicate the one or more communications based at least in part on the one or more of the transmission parameters or the reception parameters.

Some aspects described herein relate to a non-transitory computer-readable medium that stores a set of instructions for wireless communication by a UE. The set of instructions, when executed by one or more processors of the UE, may cause the UE to receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications. The set of instructions, when executed by one or more processors of the UE, may cause the UE to communicate the one or more communications based at least in part on the one or more of the transmission parameter or the reception parameter.

Some aspects described herein relate to a non-transitory computer-readable medium that stores a set of instructions for wireless communication by a network node. The set of instructions, when executed by one or more processors of the network node, may cause the network node to transmit scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications. The set of instructions, when executed by one or more processors of the network node, may cause the network node to communicate the one or more communications based at least in part on the one or more of the transmission parameters or the reception parameters.

Some aspects described herein relate to an apparatus for wireless communication. The apparatus may include means for receiving, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications. The apparatus may include means for communicating the one or more communications based at least in part on the one or more of the transmission parameter or the reception parameter.

Some aspects described herein relate to an apparatus for wireless communication. The apparatus may include means for transmitting scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications. The apparatus may include means for communicating the one or more communications based at least in part on the one or more of the transmission parameters or the reception parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications; and communicate the one or more communications based at least in part on the one or more of the transmission parameter or the reception parameter. Additionally, or alternatively, the communication manager 140 may perform one or more other operations described herein.

In some aspects, a network node (e.g., the base station 110) may include a communication manager 150. As described in more detail elsewhere herein, the communication manager 150 may transmit scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications; and communicate the one or more communications based at least in part on the one or more of the transmission parameters or the reception parameters. Additionally, or alternatively, the communication manager 150 may perform one or more other operations described herein.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. As an example, a first network node may be configured to communicate with a second network node or a third network node.

The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa.

Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

As indicated above, FIG. 1 is provided as an example. Other examples may differ from what is described with regard to FIG. 1.

Figure 2:
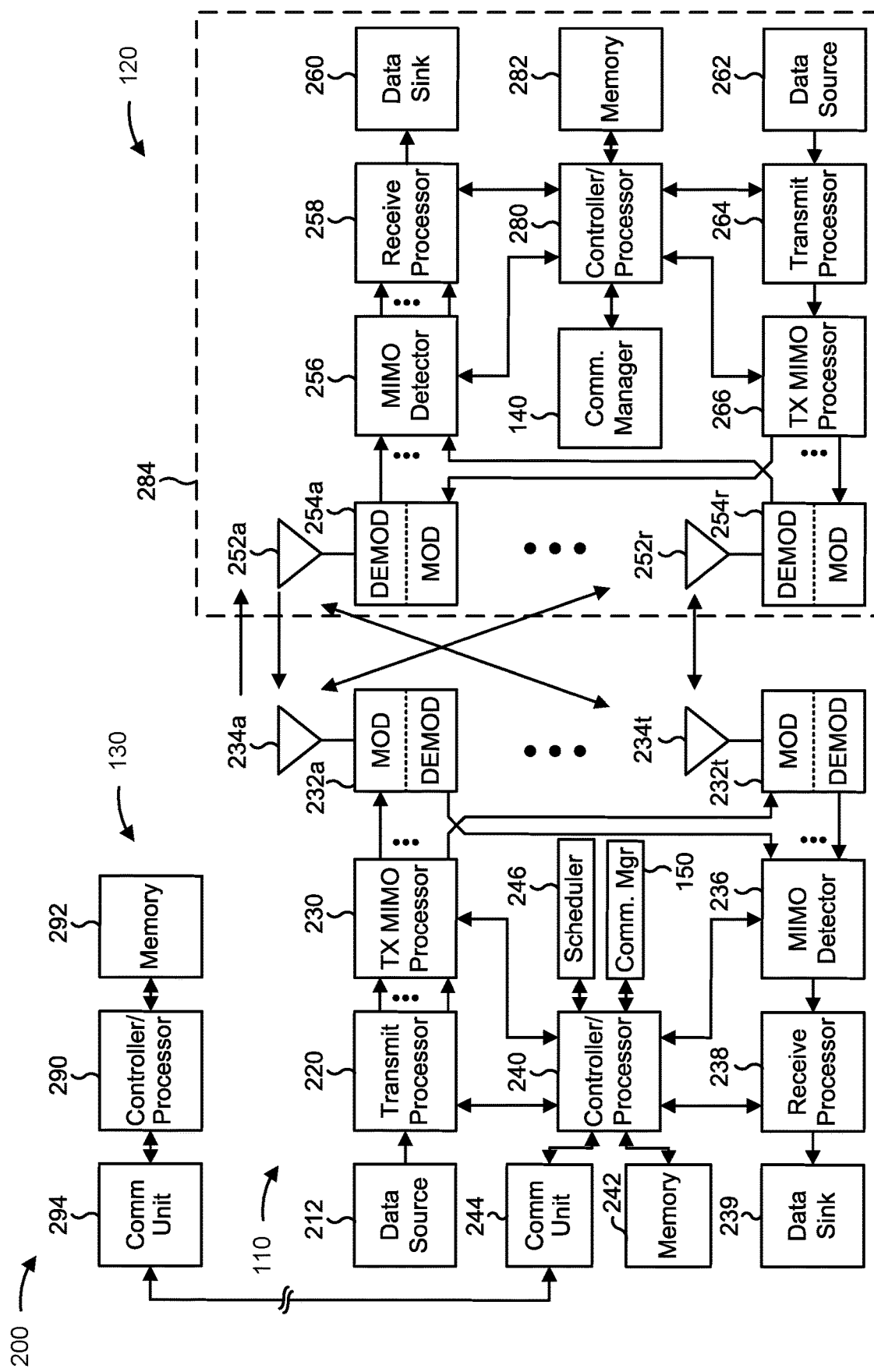
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, controller/processor 280 of the UE 120, and/or any other component(s) of FIG. 2 may perform one or more techniques associated with unifying sidelink and Uu interface downlink control information (DCI), as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications; and/or means for communicating the one or more communications based at least in part on the one or more of the transmission parameter or the reception parameter. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the base station 110) includes means for transmitting scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications; and/or means for communicating the one or more communications based at least in part on the one or more of the transmission parameters or the reception parameters. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

In some aspects, the term "base station" (e.g., the base station 110) may refer to an aggregated base station, a disaggregated base station, and/or one or more components of a disaggregated base station. For example, in some aspects, "base station" may refer to a control unit, a distributed unit, a plurality of control units, a plurality of distributed units, and/or a combination thereof. In some aspects, "base station" may refer to one device configured to perform one or more functions such as those described above in connection with the base station 110. In some aspects, "base station" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" may refer to any one or more of those different devices. In some aspects, "base station" may refer to one or more virtual base stations, one or more virtual base station functions, and/or a combination of thereof. For example, in some cases, two or more base station functions may be instantiated on a single device. In some aspects, "base station" may refer to one of the base station functions and not another. In this way, a single device may include more than one base station.

As indicated above, FIG. 2 is provided as an example. Other examples may differ from what is described with regard to FIG. 2.

Figure 3:
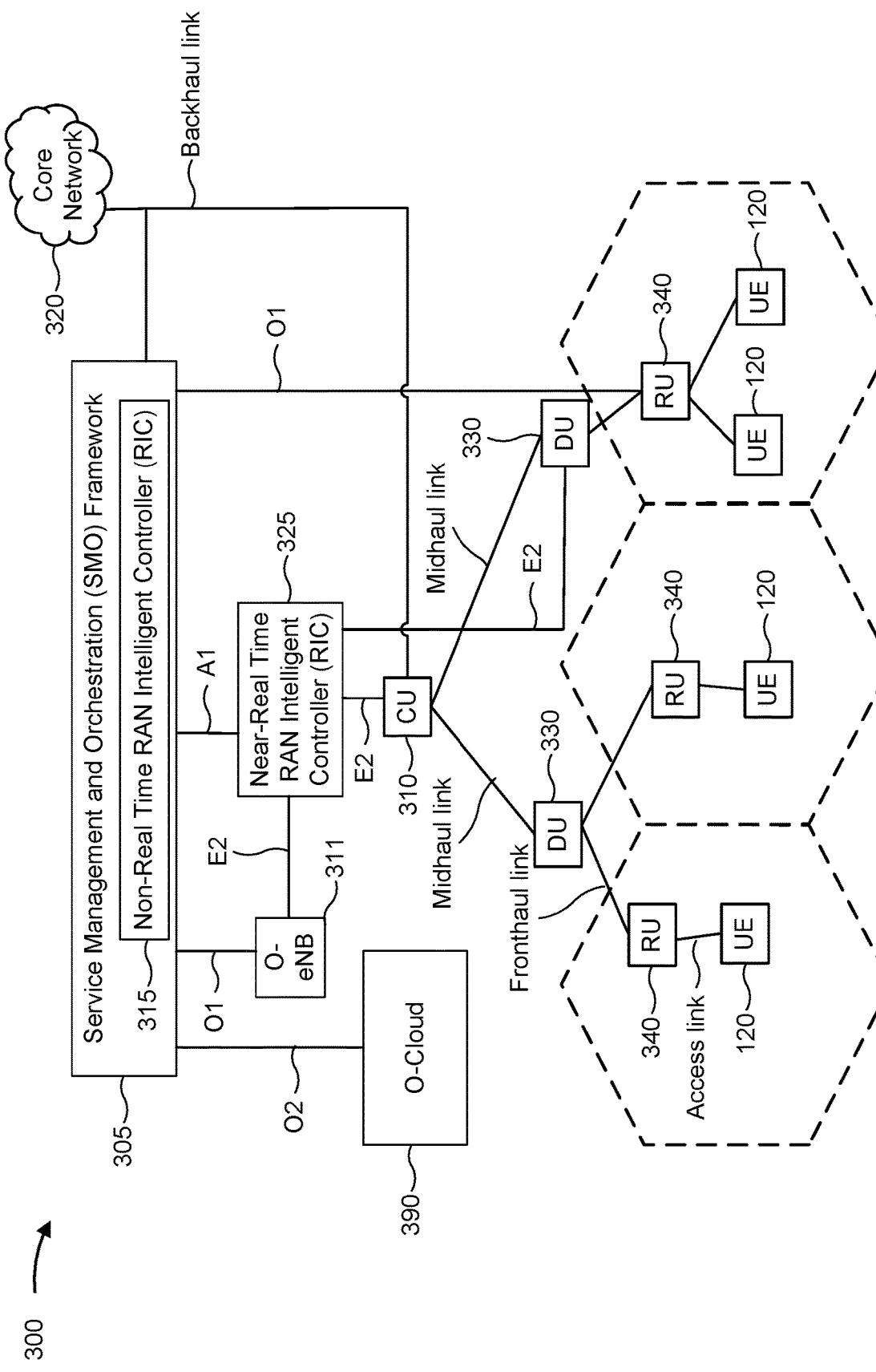
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
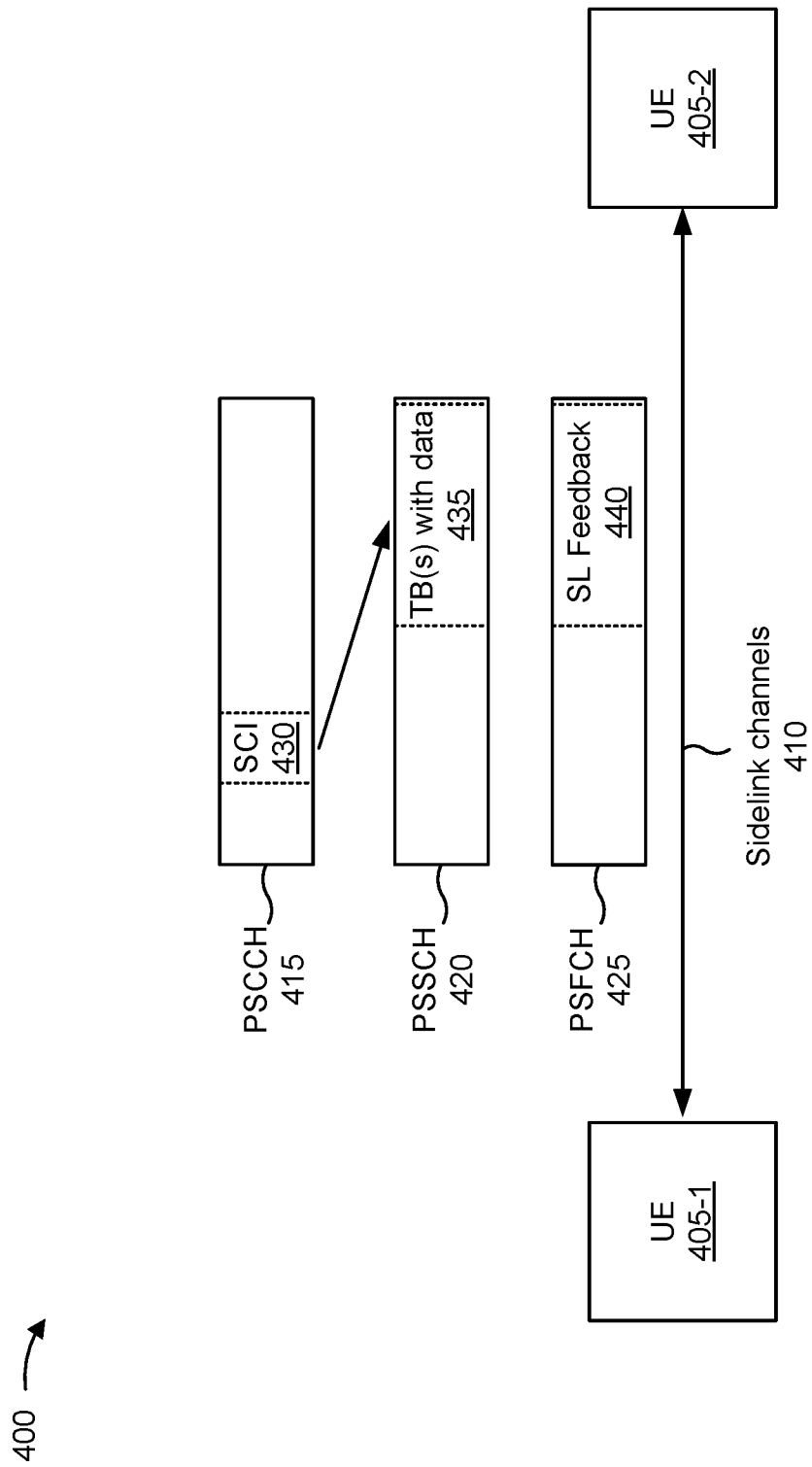
FIG. 4 is a diagram illustrating an example of sidelink communications, in accordance with the present disclosure.

FIG. 4 is a diagram illustrating an example 400 of sidelink communications, in accordance with the present disclosure. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking.

In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in a radio resource control (RRC) message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
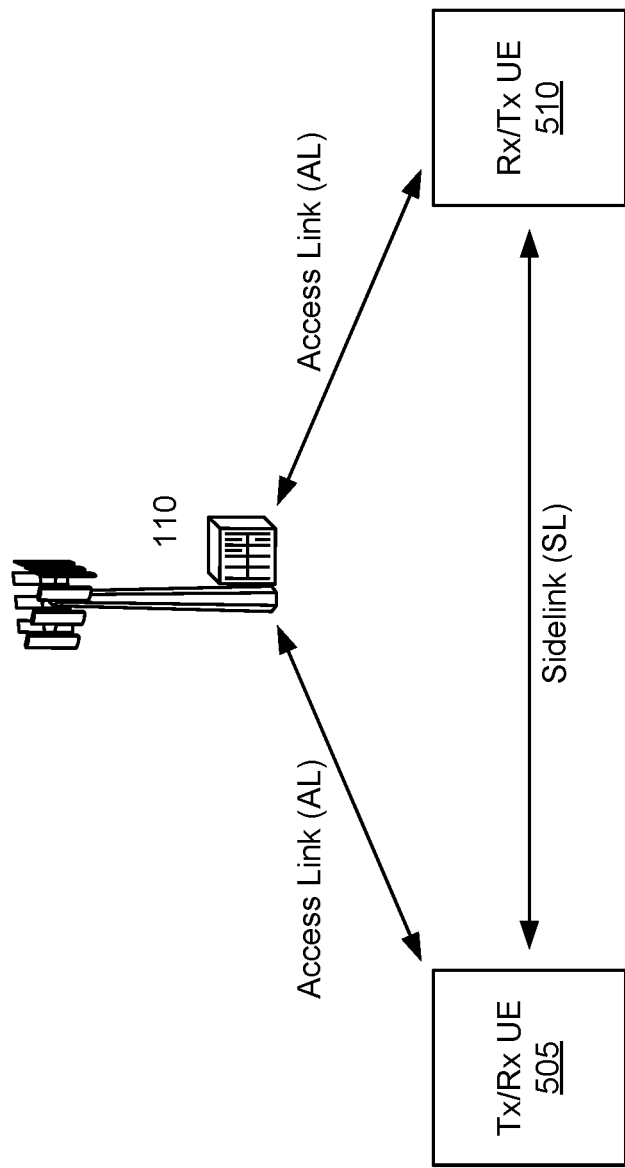
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

In some cases, the Tx/Rx UE 505 and/or the Rx/Tx UE 510 may be included in an industrial IoT (IIoT) environment. For example, the Tx/Rx UE 505 may include a programmable logic controller (PLC) and the Rx/Tx UE 510 may include a sensor or an actuator. In the IIoT environment, sidelink communications may enable direct communications between Tx/Rx UE 505 and the Rx/Tx UE 510. The communications between the Tx/Rx UE 505 and the Rx/Tx UE 510 may have tight latency requirements (e.g., 1 ms-2 ms) and an ultra-reliability requirement (e.g., $10^{-6}$ error rate).

In some cases, the IIoT environment may include equipment and/or devices which block and/or interfere with sidelink communications between the Tx/Rx UE 505 and the Rx/Tx UE 510. In these cases, a network node (e.g., a base station 110) may enable indirect communications between the Tx/Rx UE 505 and the Rx/Tx UE 510. The network node may schedule access link communication resources and sidelink communication resources. The network node may transmit DCI scheduling resources for communicating via an access link. The DCI may include a format identifier that indicates whether the resources are scheduled for an uplink or a downlink communication. Therefore, the network node may utilize a single DCI format for scheduling resources for uplink and/or downlink communications between the Tx/Rx UE 505 and the network node and/or between the Rx/Tx UE 510 and the network node.

The network node may transmit another DCI scheduling resources for communicating via a sidelink. However, a payload size of the DCI scheduling resources for communicating via the sidelink may be different from a payload size of the DCI scheduling resources for access link communications (e.g., uplink and/or downlink communications between the Tx/Rx UE 505 and the network node and/or between the Rx/Tx UE 510 and the network node).

Thus, the Tx/Rx UE 505 and/or the Rx/Tx UE 510 may be required to monitor for different DCI sizes, which may increase a complexity of the Tx/Rx UE 505 and/or the Rx/Tx UE 510 relative to UEs that are required to monitor for only a single DCI size. Further, the Tx/Rx UE 505 and/or the Rx/Tx UE 510 may be limited with respect to the number of DCI sizes for which the Tx/Rx UE 505 and/or the Rx/Tx UE 510 are able to monitor, which may limit the number of different types of DCI (e.g., group common DCI for TPC and/or pre-emption, among other examples) that the network node can utilize to schedule and/or manage network resources.

Some techniques and apparatuses described herein enable unified scheduling information for scheduling communications over an uplink, a downlink, and a sidelink. The unified scheduling information may comprise a single payload size, thereby reducing UE complexity relative to UEs configured to monitor for different sized payloads. Further, the single payload size may enable additional types of scheduling information (e.g., group common DCI for transmit power control and/or preemption, among other examples) without exceeding a payload size budget.

In some aspects, the unified scheduling information may enable simultaneous scheduling of sidelink and downlink receptions and sidelink and uplink transmissions, thereby reducing an amount of transmitted data relative to scheduling the transmissions and receptions separately. Further, the unified scheduling information may enable sidelink resources to be extended to utilize both flexible and downlink symbols rather than only certain specific uplink resources.

As indicated above, FIG. 5 is provided as an example. Other examples may differ from what is described with respect to FIG. 5.

Figure 6:
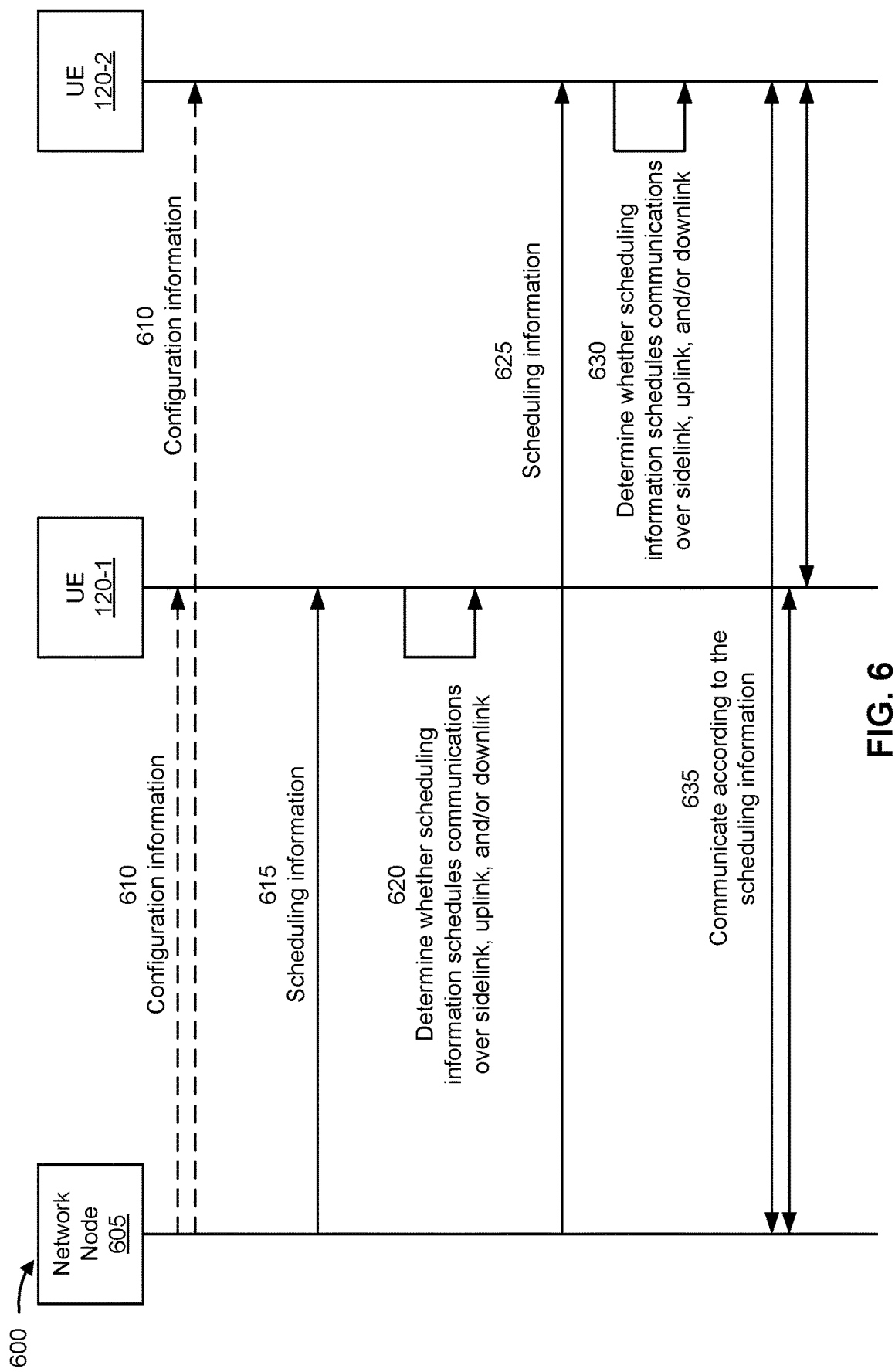
FIG. 6 is a diagram illustrating an example associated with unifying sidelink and Uu interface downlink control information (DCI), in accordance with the present disclosure.

FIG. 6 is a diagram illustrating an example 600 associated with unifying sidelink and Uu interface DCI, in accordance with the present disclosure. As shown in FIG. 6, a network node 605, a first UE 120-1, and a second UE 120-2 may communicate with one another. For example, the network node 605, first UE 120-1, and second UE 120-2 may communicate with one another via access link communications and/or sidelink communications, as described elsewhere herein.

In some aspects, the first UE 120-1 and the second UE 120-2 may be included in an IIoT environment. For example, the first UE 120-1 may include a PLC that communicates with one or more second UEs 120-2 corresponding to one or more sensors and/or actuators.

In some aspects, as shown by reference number 610, the network node 605 may transmit configuration information to the first UE 120-1 and/or the second UE 120-2. In some aspects, the configuration information may be transmitted via RRC signaling. The configuration information may indicate one or more parameters associated with scheduling access link communications and/or sidelink communications for the first UE 120-1 and/or the second UE 120-2.

In some aspects, the configuration information may indicate that unified scheduling information may be configured for one or more DCI formats associated with access link communications. For example, DCI 0_0 and DCI 1_0 may correspond to fallback DCI for scheduling one PUSCH and one PDSCH, respectively. DCI 0_1 and DCI 1_1 may correspond to DCI for scheduling one or more PUSCHs and one or more PDSCHs, respectively. DCI 0_2 and DCI 1_2 may correspond to DCI for scheduling PUSCHs and PDSCHs, respectively. The configuration information may indicate that unified scheduling information may be configured for DCI 0_1 and DCI 1_1 and/or DCI 0_2 and DCI 1_2.

In some aspects, the network node 605 may determine that the unified scheduling information is configured for a DCI format based at least in part on a size of a payload of the unified scheduling information. For example, the network node 605 may determine that the size of the payload of the unified scheduling information is similar to (e.g., less than a threshold difference from) a size of a payload for DCI 0_1 and DCI 1_1 (or DCI 0_2 and DCI 1_2). The network node 605 may determine that the unified scheduling information is configured for DCI 0_1 and DCI 1_1 based at least in part on the that the size of the payload of the unified scheduling information being similar to the size of the payload for DCI 0_1 and DCI 1_1.

In some aspects, the configuration information may indicate that, when the scheduling information schedules a sidelink communication, one or more fields associated with the DCI format for which the unified scheduling information is configured are re-purposed to indicate a parameter associated with the sidelink configuration. For example, the configuration information may indicate that a particular DCI field (e.g., a precoding matrix indicator (PMI) field or an uplink shared channel indicator, among other examples) indicates a PUCCH resource indicator (PRI) associated with transmitting sidelink feedback information, a sidelink assignment index (SAI), a configuration index, PUCCH feedback timing, or a UE identifier, among other examples.

In some aspects, the configuration information may indicate that a time domain resource allocation associated with access link communications and/or sidelink communications follows a first allocation procedure associated with allocating access link resources or a second allocation procedure associated with allocating sidelink resources. In some aspects, the configuration information may indicate that a frequency domain resource allocation associated with access link communications and/or sidelink communications follows the first allocation procedure or the second allocation procedure.

As shown by reference number 615, the network node 605 may provide scheduling information to the first UE 120-1. For example, the network node 605 may provide DCI that includes scheduling information to the first UE 120-1. The scheduling information may schedule one or more communications over a sidelink, an uplink, and/or a downlink. The scheduling information may include an indicator indicating that the one or more communications are scheduled over the sidelink, the uplink, and/or the downlink.

In some aspects, the indicator may include a format identifier (e.g., a DCI format identifier). In some aspects, the format identifier may indicate a format associated with the scheduling information, and the format associated with the scheduling information may indicate whether the one or more communications are scheduled over the sidelink, the uplink, and/or the downlink.

As an example, the scheduling information may be included in DCI associated with a DCI format identifier. The DCI format identifier may indicate a first DCI format based at least in part on the one or more communications comprising an uplink communication, a second DCI format based at least in part on the one or more communications comprising a downlink communication, a third DCI format based at least in part on the one or more communications comprising a sidelink transmission, a fourth DCI format based at least in part on the one or more communications comprising a sidelink reception, a fifth DCI format based at least in part on the one or more communications comprising the sidelink transmission and the sidelink reception, a sixth DCI format based at least in part on the one or more communications comprising the uplink communication and the sidelink transmission, or a seventh DCI format based at least in part on the one or more communications comprising the downlink communication and the sidelink reception.

In some aspects, the first UE 120-1 may be configured to operate in a full-duplex mode or a frequency division duplexing mode, and the DCI format identifier may indicate an eighth DCI format or a ninth DCI format. The DCI format identifier may indicate the eighth DCI format based at least in part on the one or more communications comprising the uplink communication and the downlink communication. The DCI format identifier may indicate the ninth DCI format based at least in part on the one or more communications including the sidelink transmission and the sidelink reception.

In some aspects, the DCI format identifier may indicate the third DCI format and the scheduling information may indicate a receiving device associated with the sidelink transmission. In some aspects, the DCI format identifier may indicate the fourth DCI format and the scheduling information may indicate a transmitting device associated with the sidelink transmission. In some aspects, the DCI format identifier may indicate the fifth DCI format and the scheduling information may indicate a receiving device and a transmitting device associated with the sidelink transmission.

In some aspects, the indicator (e.g., the format identifier) may include a plurality of bits. The plurality of bits may be set to one of a plurality of values to indicate whether the one or more communications are scheduled over the sidelink, the uplink, and/or the downlink. For example, the plurality of bits may be set to a first value to indicate that the one or more communications are scheduled over the uplink, a second value to indicate that the one or more communications are scheduled over the downlink, a third value to indicate that the one or more communications are scheduled over the sidelink, a fourth value to indicate that a first communication of the one or more communications is scheduled over the uplink and a second communication of the one or more communications is scheduled over the sidelink, or a fifth value to indicate that the first communication is scheduled over the downlink and the second communication is scheduled over the sidelink.

In some aspects, the plurality of bits may be set to the fourth value to indicate that a first communication of the one or more communications is scheduled over the uplink and a second communication of the one or more communications is scheduled over the sidelink, and the scheduling information may indicate a time division multiplexing configuration, a frequency division multiplexing configuration, and/or a spatial division multiplexing configuration. Similarly, in some aspects, the plurality of bits may be set to the fifth value to indicate that the first communication is scheduled over the downlink and the second communication is scheduled over the sidelink, and the scheduling information may indicate a time division multiplexing configuration, a frequency division multiplexing configuration, and/or a spatial division multiplexing configuration.

In some aspects, the first UE 120-1 may determine whether the indicator indicates the sidelink communication, the uplink communication, and/or the downlink communication based at least in part on the configuration information. In some aspects, the network node 605 provides first configuration information to the first UE 120-1 and second configuration to the second UE 120-2. The first configuration information may indicate that the scheduling information (e.g., the indicator) is to be interpreted based at least in part on a first mapping, and the second configuration information may indicate that the scheduling information (e.g., the indicator) is to be interpreted based on a second mapping that is different from the first mapping.

As an example, the indicator may include the DCI format identifier and the first mapping may indicate that the DCI format identifier indicates the first DCI format based at least in part on the scheduling information scheduling the uplink communication and/or the sidelink transmission. The second mapping may indicate that the DCI format identifier indicates the first DCI format based at least in part on the scheduling information scheduling the downlink communication and/or the sidelink reception. In this way, the network node 605 may utilize the same scheduling information to schedule different communications for the first UE 120-1 and the second UE 120-2.

In some aspects, the scheduling information may indicate whether the scheduling information schedules one or more communications over the sidelink, the uplink, and/or the downlink based at least in part on a value or a parameter utilized to scramble one or more portions of the scheduling information. For example, a first parameter (e.g., a reception parameter or a transmission parameter, among other examples) may be utilized to scramble a first portion of the scheduling information to indicate that the scheduling information schedules one or more communications over the sidelink. A second parameter may be utilized to scramble a second portion of the scheduling information to indicate that the scheduling information schedules one or more communications over the uplink. A third parameter may be utilized to scramble a third portion of the scheduling information to indicate that the scheduling information schedules one or more communications over the downlink.

In some aspects, the first portion of the scheduling information, the second portion of the scheduling information, and the third portion of the scheduling information may be the same portion of the scheduling information, and the first parameter, the second parameter, and the third parameter may be different parameters. For example, the first portion of the scheduling information, the second portion of the scheduling information, and the third portion of the scheduling information may correspond to a cyclic redundancy check (CRC) value included in the scheduling information, and the first parameter may include a first RNTI (e.g., a sidelink RNTI), the second parameter may include a second RNTI (e.g., a configured scheduling RNTI), and the third parameter may include a third RNTI (e.g., a sidelink configured scheduling RNTI).

In some aspects, the first portion of the scheduling information, the second portion of the scheduling information, and the third portion of the scheduling information may be different portions of the scheduling information and the first parameter, the second parameter, and the third parameter may the same parameter. For example, the first parameter, the second parameter, and the third parameter may correspond to an RNTI and the first portion of the scheduling information may correspond to the CRC value, the second portion of the scheduling information may correspond to a format identifier, and the third portion of the scheduling information may correspond to a UE identifier included in the scheduling information.

In some aspects, the scheduling information may provide one or more transmission parameters for the one or more communications and/or one or more reception parameters for the one or more communications. In some aspects, the one or more transmission parameters and/or the one or more reception parameters may include an MCS for access link communications and/or sidelink communications, a TPC for access link communications and/or sidelink communications, a TPC for access link communications and/or sidelink communications, and/or a redundancy version identifier (RV-ID) for access link communications and/or sidelink communications. In this way, the network node 605 may directly control the MCS, TPC, and/or the RV-ID for both access link and sidelink communications.

Additionally, or alternatively, the one or more transmission parameters and/or the one or more reception parameters may include a slot format indicator (SFI) for access link communications and/or sidelink communications, a channel occupancy time (COT) for access link communications and/or sidelink communications, an RB set for access link communications and/or sidelink communications, a search space switch, downlink pre-emption, sidelink pre-emption, uplink cancellation, sidelink cancellation, access link soft resources for integrated access and backhaul (IAB), sidelink soft resources for IAB, whether discontinuous reception (DRX) is configured for access link communications and/or sidelink communications, and/or a DRX wake-up indication for access link communications and/or sidelink communications.

In some aspects, the one or more transmission parameters and/or the one or more reception parameters may include a sounding reference signal (SRS) resource indicator (SRI), a channel state information (CSI) request, and/or one or more parameters associated with cross-carrier scheduling. In this way, the scheduling information may enable SRI, CSI requests, and cross-carrier scheduling to be supported for sidelink communications.

As shown by reference number 620, the first UE 120-1 may determine whether the scheduling information schedules one or more communications over the sidelink, the uplink, and/or downlink. For example, the first UE 120-1 may determine whether the scheduling information schedules one or more communications over the sidelink, the uplink, and/or the downlink based at least in part on the indicator included in the scheduling information, the configuration information (e.g., the first mapping), a portion of the scheduling information that is scrambled utilizing a particular value or parameter, and/or the particular value or parameter utilized to scramble a portion of the scheduling information.

As shown by reference number 625, the network node 605 may provide scheduling information to the second UE 120-2. In some aspects, the network node 605 may provide scheduling information to the second UE 120-2 in a manner similar to that described above with respect to the first UE 120-1. In some aspects, the scheduling information provided to the second UE 120-2 may be different from the scheduling information provided to the first UE 120-1.

In some aspects, the scheduling information provided to the second UE 120-2 may be the same as the scheduling information provided to the first UE 120-1. In these aspects, the second UE 120-2 may interpret the scheduling information based at least in part on a mapping that is different from a mapping utilized by the first UE 120-1 to interpret the scheduling information.

As shown by reference number 630, the second UE 120-2 may determine whether the scheduling information schedules one or more communications over the sidelink, the uplink, and/or the downlink. In some aspects, the second UE 120-2 may determine whether the scheduling information schedules one or more communications over the sidelink, the uplink, and/or the downlink in a manner similar to that described above with respect to the first UE 120-1.

As shown by reference number 635, the network node 605, the first UE 120-1, and/or the second UE 120-2 may communicate the one or more communications over the sidelink, the uplink, and/or the downlink according to the scheduling information.

As indicated above, FIG. 6 is provided as an example. Other examples may differ from what is described with respect to FIG. 6.

Figure 7:
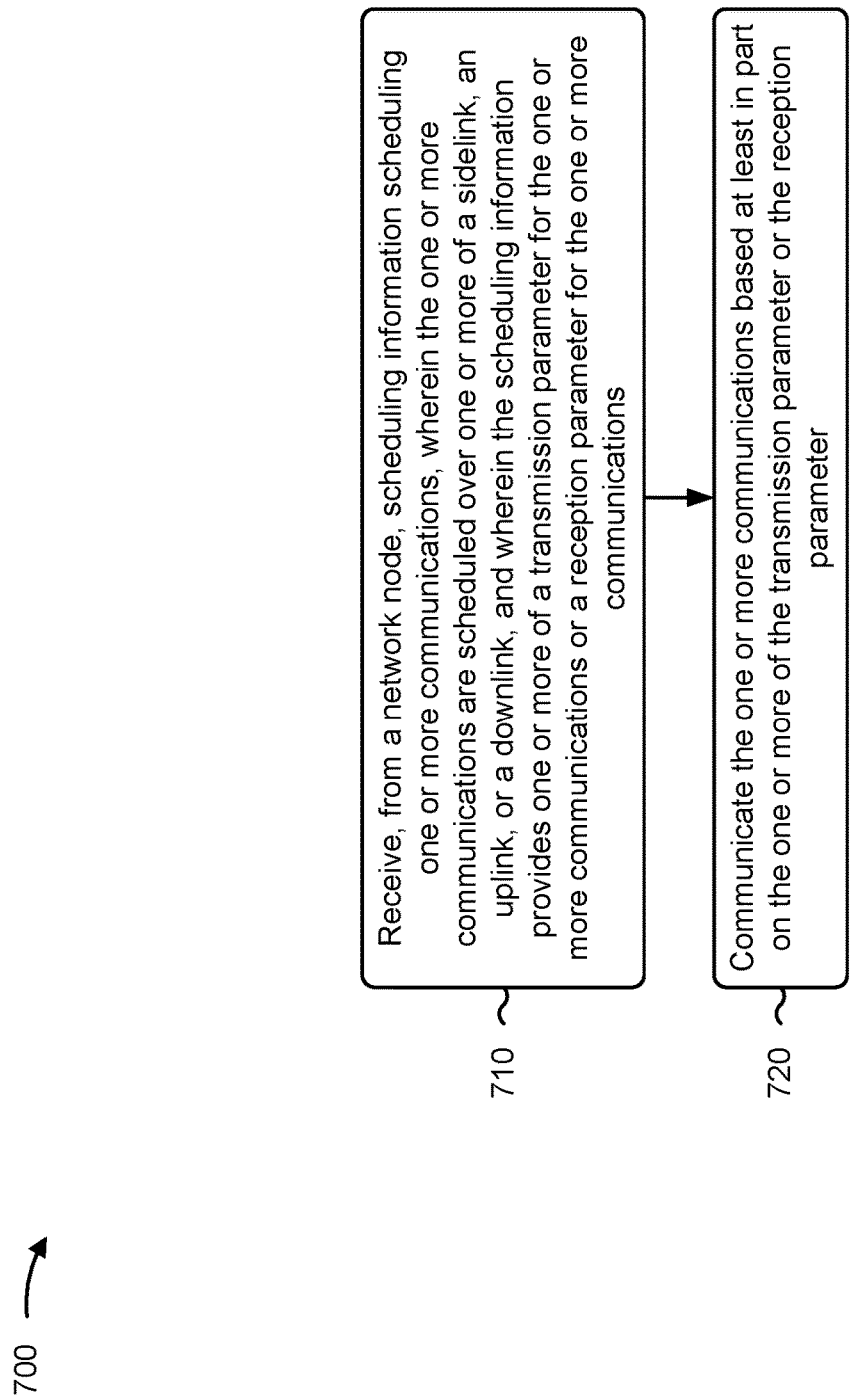
FIGS. 7 and 8 are diagrams illustrating example processes associated with unifying sidelink and Uu interface DCI, in accordance with the present disclosure.

FIG. 7 is a diagram illustrating an example process 700 performed, for example, by a UE, in accordance with the present disclosure. Example process 700 is an example where the UE (e.g., UE 120) performs operations associated with unifying sidelink and Uu interface DCI.

As shown in FIG. 7, in some aspects, process 700 may include receiving, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications (block 710). For example, the UE (e.g., using communication manager 140 and/or reception component 902, depicted in FIG. 9) may receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications, as described above.

As further shown in FIG. 7, in some aspects, process 700 may include communicating the one or more communications based at least in part on the one or more of the transmission parameter or the reception parameter (block 720). For example, the UE (e.g., using communication manager 140, reception component 902, and/or transmission component 904, depicted in FIG. 9) may communicate the one or more communications based at least in part on the one or more of the transmission parameter or the reception parameter, as described above.

Process 700 may include additional aspects, such as any single aspect or any combination of aspects described below and/or in connection with one or more other processes described elsewhere herein.

In a first aspect, the scheduling information includes a plurality of bits corresponding to a DCI format identifier.

In a second aspect, the plurality of bits are set to a first value to indicate that the one or more communications are scheduled over the uplink, a second value to indicate that the one or more communications are scheduled over the downlink, a third value to indicate that the one or more communications are scheduled over the sidelink, a fourth value to indicate that a first communication of the one or more communications is scheduled over the uplink and a second communication of the one or more communications is scheduled over the sidelink, or a fifth value to indicate that the first communication is scheduled over the downlink and the second communication is scheduled over the sidelink.

In a third aspect, the plurality of bits are set to the fourth value or the fifth value, and the scheduling information indicates one or more of a time division multiplexing configuration, a frequency division multiplexing configuration, or a spatial division multiplexing configuration.

In a fourth aspect, process 700 includes receiving an indication that one or more of a time domain resource allocation or a frequency domain allocation follows a first allocation procedure or a second allocation procedure, wherein the first allocation procedure is associated with allocating access link resources and the second allocation procedure is associated with allocating sidelink resources.

In a fifth aspect, the indication that the one or more of the time domain resource allocation or the frequency domain allocation follows the first allocation procedure or the second allocation procedure is received via radio resource control (RRC) signaling.

In a sixth aspect, the scheduling information comprises a CRC value scrambled by an RNTI, wherein the RNTI used to scramble the CRC value indicates that the scheduling information is associated with scheduling the one or more communications over the one or more of the sidelink, the uplink, or the downlink.

In a seventh aspect, the scheduling information indicates that the one or more communications are scheduled over the sidelink, and a PMI field indicates a PUCCH resource indicator associated with transmitting sidelink feedback information, a sidelink resource pool, an SAI, a configuration index, PUCCH feedback timing, or a user equipment identifier.

In an eighth aspect, the scheduling information indicates that the one or more communications are scheduled over the sidelink, and an uplink shared channel indicator indicates PM associated with transmitting sidelink feedback information, a sidelink resource pool, an SAI, a configuration index, PUCCH feedback timing, or a UE identifier.

In a ninth aspect, the scheduling information is included in DCI that is associated with a DCI format identifier, and the DCI format identifier indicates a first DCI format based at least in part on the one or more communications comprising an uplink communication, a second DCI format based at least in part on the one or more communications comprising a downlink communication, a third DCI format based at least in part on the one or more communications comprising a sidelink transmission, a fourth DCI format based at least in part on the one or more communications comprising a sidelink reception, a fifth DCI format based at least in part on the one or more communications comprising the sidelink transmission and the sidelink reception, a sixth DCI format based at least in part on the one or more communications comprising the uplink communication and the sidelink transmission, or a seventh DCI format based at least in part on the one or more communications comprising the downlink communication and the sidelink reception.

In a tenth aspect, the DCI format identifier indicates the third DCI format, and the DCI indicates a receiving device associated with the sidelink transmission.

In an eleventh aspect, the DCI format identifier indicates the fourth DCI format, and the DCI indicates a transmitting device associated with the sidelink reception.

In a twelfth aspect, the DCI format identifier indicates the fifth DCI format, and the DCI indicates a transmitting device associated with the sidelink reception and a receiving device associated with the sidelink transmission.

In a thirteenth aspect, the UE is configured to operate in a full-duplex mode or a frequency division duplexing mode, and the DCI format identifier indicates an eighth DCI format based at least in part on the one or more communications comprising the uplink communication and the downlink communication or a ninth DCI format based at least in part on the one or more communications including the sidelink transmission and the sidelink reception.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
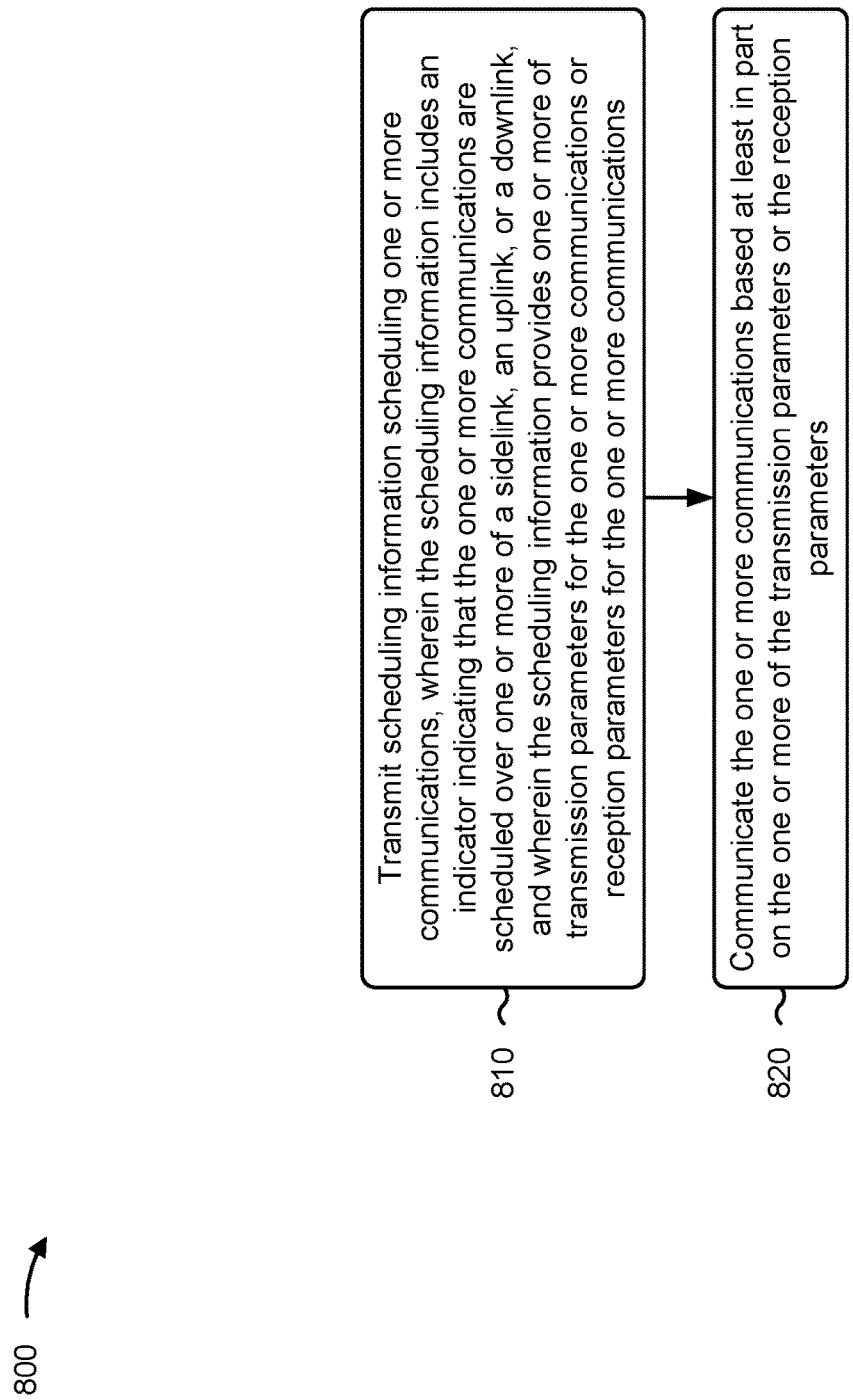

FIG. 8 is a diagram illustrating an example process 800 performed, for example, by a network node, in accordance with the present disclosure. Example process 800 is an example where the network node (e.g., network node 605) performs operations associated with unifying sidelink and Uu interface DCI.

As shown in FIG. 8, in some aspects, process 800 may include transmitting scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications (block 810). For example, the network node (e.g., using communication manager 1008 and/or transmission component 1004, depicted in FIG. 10) may transmit scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications, as described above.

As further shown in FIG. 8, in some aspects, process 800 may include communicating the one or more communications based at least in part on the one or more of the transmission parameters or the reception parameters (block 820). For example, the network node (e.g., using communication manager 1008, reception component 1002, and/or transmission component 1004, depicted in FIG. 10) may communicate the one or more communications based at least in part on the one or more of the transmission parameters or the reception parameters, as described above.

Process 800 may include additional aspects, such as any single aspect or any combination of aspects described below and/or in connection with one or more other processes described elsewhere herein.

In a first aspect, process 800 includes transmitting a first configuration to a first UE, wherein the first configuration indicates that the indicator corresponds to the one or more communications being scheduled over the uplink, and transmitting a second configuration to a second UE, wherein the second configuration indicates that the indicator corresponds to the one or more communications being scheduled over the downlink, wherein the scheduling information is transmitted to the first UE to schedule uplink resources for the first UE and the scheduling information is transmitted to the second UE to schedule downlink resources for the second UE.

In a second aspect, process 800 includes receiving an indication that the first UE includes a capability associated with a scheduling mode, wherein the first configuration is transmitted to the first UE based at least in part on the first UE including the capability associated with the scheduling mode.

In a third aspect, the first UE and the second UE are associated with one or more of a same search space configuration, a same sidelink RNTI, or a same sidelink configured scheduling RNTI.

In a fourth aspect, the scheduling information indicates a receiving device or a transmitting device associated with the one or more communications.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
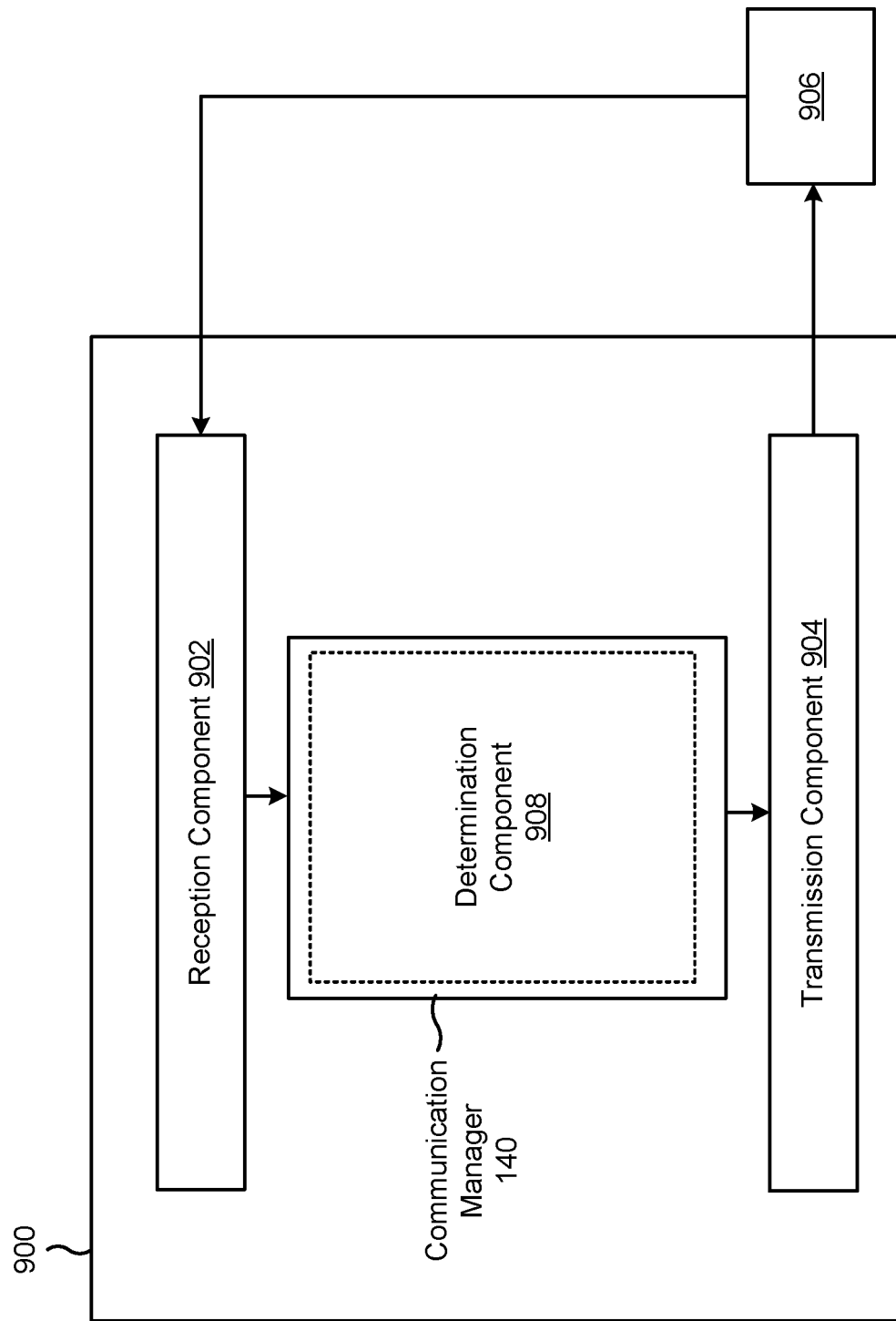
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a determination component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications. The determination component 908 may determine whether the one or more communications are scheduled over the sidelink, the uplink, and/or the downlink based at least in part on the scheduling information. The reception component 902 and/or the transmission component 904 may communicate the one or more communications based at least in part on the one or more of the transmission parameter or the reception parameter.

The reception component 902 may receive an indication that one or more of a time domain resource allocation or a frequency domain allocation follows a first allocation procedure or a second allocation procedure, wherein the first allocation procedure is associated with allocating access link resources and the second allocation procedure is associated with allocating sidelink resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
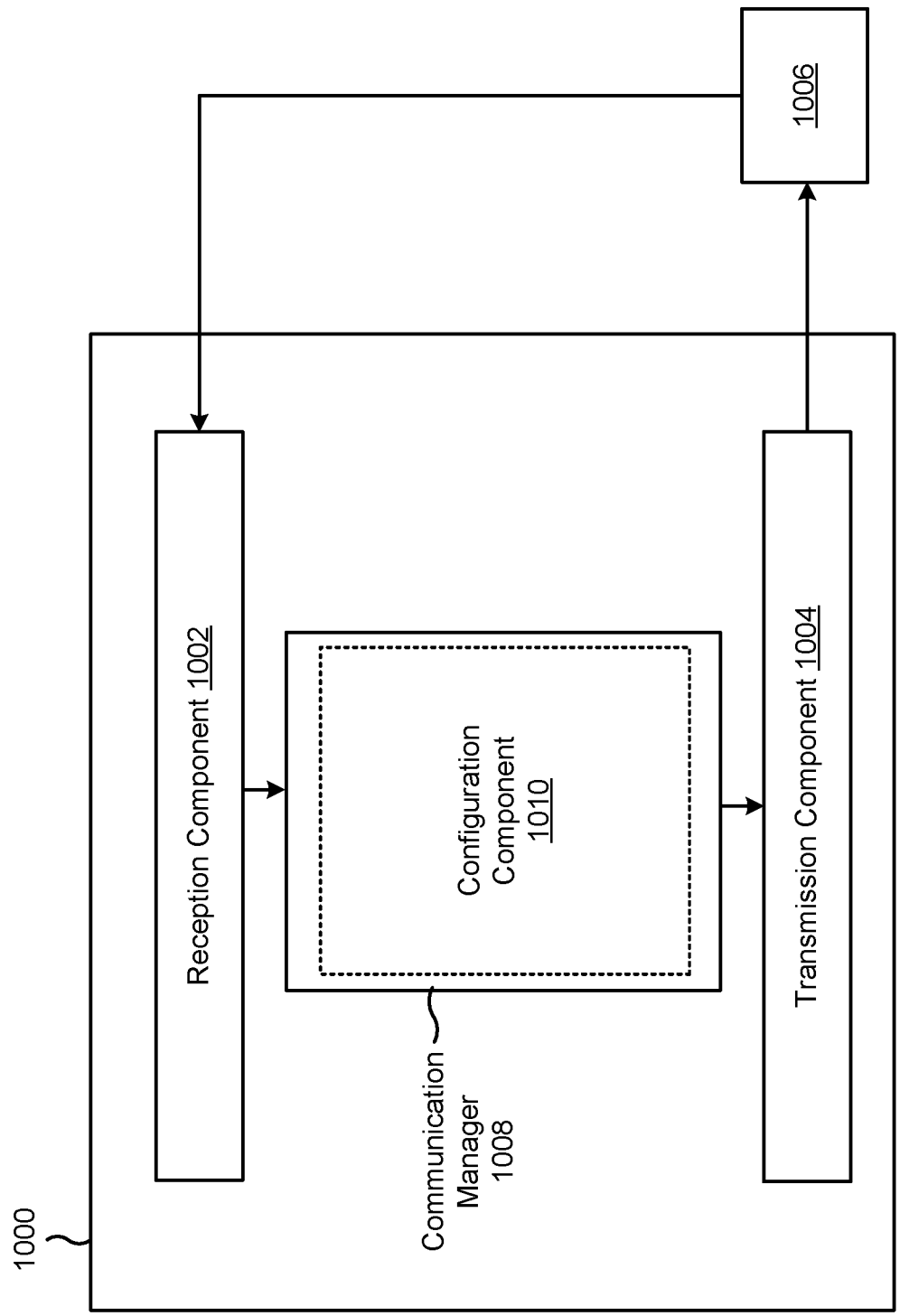

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008.

The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the base station described in connection with FIG. 2. The communication manager 1008 may be, or be similar to, the communication manager 150 depicted in FIGS. 1 and 2. For example, in some aspects, the communication manager 1008 may be configured to perform one or more of the functions described as being performed by the communication manager 150. In some aspects, the communication manager 1008 may include the reception component 1002 and/or the transmission component 1004. The communication manager 1008 may a configuration component 1010, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications. The reception component 1002 and/or the transmission component 1004 may communicate the one or more communications based at least in part on the one or more of the transmission parameters or the reception parameters.

The configuration component 1010 may generate a first configuration and a second configuration. The transmission component 1004 may transmit the first configuration to a first UE, wherein the first configuration indicates that the indicator corresponds to the one or more communications being scheduled over the uplink.

The transmission component 1004 may transmit the second configuration to a second UE, wherein the second configuration indicates that the indicator corresponds to the one or more communications being scheduled over the downlink, wherein the scheduling information is transmitted to the first UE to schedule uplink resources for the first UE, and wherein the scheduling information is transmitted to the second UE to schedule downlink resources for the second UE.

The reception component 1002 may receive an indication that the first UE includes a capability associated with a scheduling mode, wherein the first configuration is transmitted to the first UE based at least in part on the first UE including the capability associated with the scheduling mode.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network node, scheduling information scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications; and communicating the one or more communications based at least in part on the one or more of the transmission parameter or the reception parameter.

Aspect 2: The method of Aspect 1, wherein the scheduling information includes a plurality of bits corresponding to a DCI format identifier.

Aspect 3: The method of Aspect 2, wherein the plurality of bits are set to: a first value to indicate that the one or more communications are scheduled over the uplink, a second value to indicate that the one or more communications are scheduled over the downlink, a third value to indicate that the one or more communications are scheduled over the sidelink, a fourth value to indicate that a first communication of the one or more communications is scheduled over the uplink and a second communication of the one or more communications is scheduled over the sidelink, or a fifth value to indicate that the first communication is scheduled over the downlink and the second communication is scheduled over the sidelink.

Aspect 4: The method of Aspect 3, wherein the plurality of bits are set to the fourth value or the fifth value, and wherein the scheduling information indicates one or more of a time division multiplexing configuration, a frequency division multiplexing configuration, or a spatial division multiplexing configuration.

Aspect 5: The method of one or more of Aspects 1 through 4, further comprising: receiving an indication that one or more of a time domain resource allocation or a frequency domain allocation follows a first allocation procedure or a second allocation procedure, wherein the first allocation procedure is associated with allocating access link resources and the second allocation procedure is associated with allocating sidelink resources.

Aspect 6: The method of Aspect 5, wherein the indication that the one or more of the time domain resource allocation or the frequency domain allocation follows the first allocation procedure or the second allocation procedure is received via RRC signaling.

Aspect 7: The method of one or more of Aspects 1 through 6, wherein the scheduling information comprises a CRC value scrambled by an RNTI, wherein the RNTI used to scramble the CRC value indicates that the scheduling information is associated with scheduling the one or more communications over the one or more of the sidelink, the uplink, or the downlink.

Aspect 8: The method of one or more of Aspects 1 through 7, wherein the scheduling information indicates that the one or more communications are scheduled over the sidelink, and wherein a PMI field indicates a PM associated with transmitting sidelink feedback information, a sidelink resource pool, an SAI, a configuration index, PUCCH feedback timing, or a UE identifier.

Aspect 9: The method of one or more of Aspects 1 through 8, wherein the scheduling information indicates that the one or more communications are scheduled over the sidelink, and wherein an uplink shared channel indicator indicates a PM associated with transmitting sidelink feedback information, a sidelink resource pool, an SAI, a configuration index, PUCCH feedback timing, or a UE identifier.

Aspect 10: The method of one or more of Aspects 1 through 9, wherein the scheduling information is included in DCI that is associated with a DCI format identifier, and wherein the DCI format identifier indicates: a first DCI format based at least in part on the one or more communications comprising an uplink communication, a second DCI format based at least in part on the one or more communications comprising a downlink communication, a third DCI format based at least in part on the one or more communications comprising a sidelink transmission, a fourth DCI format based at least in part on the one or more communications comprising a sidelink reception, a fifth DCI format based at least in part on the one or more communications comprising the sidelink transmission and the sidelink reception, a sixth DCI format based at least in part on the one or more communications comprising the uplink communication and the sidelink transmission, or a seventh DCI format based at least in part on the one or more communications comprising the downlink communication and the sidelink reception.

Aspect 11: The method of Aspect 10, wherein the DCI format identifier indicates the third DCI format, and wherein the DCI indicates a receiving device associated with the sidelink transmission.

Aspect 12: The method of Aspect 10, wherein the DCI format identifier indicates the fourth DCI format, and wherein the DCI indicates a transmitting device associated with the sidelink reception.

Aspect 13: The method of Aspect 10, wherein the DCI format identifier indicates the fifth DCI format, and wherein the DCI indicates a transmitting device associated with the sidelink reception and a receiving device associated with the sidelink transmission.

Aspect 14: The method of Aspect 10, wherein the UE is configured to operate in a full-duplex mode or a frequency division duplexing mode, and wherein the DCI format identifier indicates: an eighth DCI format based at least in part on the one or more communications comprising the uplink communication and the downlink communication, or a ninth DCI format based at least in part on the one or more communications including the sidelink transmission and the sidelink reception.

Aspect 15: A method of wireless communication performed by a network node, comprising: transmitting scheduling information scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications; and communicating the one or more communications based at least in part on the one or more of the transmission parameters or the reception parameters.

Aspect 16: The method of Aspect 15, further comprising: transmitting a first configuration to a first UE, wherein the first configuration indicates that the indicator corresponds to the one or more communications being scheduled over the uplink; and transmitting a second configuration to a second UE, wherein the second configuration indicates that the indicator corresponds to the one or more communications being scheduled over the downlink, wherein the scheduling information is transmitted to the first UE to schedule uplink resources for the first UE, and wherein the scheduling information is transmitted to the second UE to schedule downlink resources for the second UE.

Aspect 17: The method of Aspect 16, further comprising: receiving an indication that the first UE includes a capability associated with a scheduling mode, wherein the first configuration is transmitted to the first UE based at least in part on the first UE including the capability associated with the scheduling mode.

Aspect 18: The method of Aspect 16, wherein the first UE and the second UE are associated with one or more of a same search space configuration, a same sidelink RNTI, or a same sidelink configured scheduling RNTI.

Aspect 19: The method of Aspect 16, wherein the scheduling information indicates a receiving device or a transmitting device associated with the one or more communications.

Aspect 20: An apparatus for wireless communication at a device, comprising a processor; memory coupled with the processor; and instructions stored in the memory and executable by the processor to cause the apparatus to perform the method of one or more of Aspects 1 through 14.

Aspect 21: A device for wireless communication, comprising a memory and one or more processors coupled to the memory, the one or more processors configured to perform the method of one or more of Aspects 1 through 14.

Aspect 22: An apparatus for wireless communication, comprising at least one means for performing the method of one or more of Aspects 1 through 14.

Aspect 23: A non-transitory computer-readable medium storing code for wireless communication, the code comprising instructions executable by a processor to perform the method of one or more of Aspects 1 through 14.

Aspect 24: A non-transitory computer-readable medium storing a set of instructions for wireless communication, the set of instructions comprising one or more instructions that, when executed by one or more processors of a device, cause the device to perform the method of one or more of Aspects 1 through 14.

Aspect 25: An apparatus for wireless communication at a device, comprising a processor; memory coupled with the processor; and instructions stored in the memory and executable by the processor to cause the apparatus to perform the method of one or more of Aspects 15 through 19.

Aspect 26: A device for wireless communication, comprising a memory and one or more processors coupled to the memory, the one or more processors configured to perform the method of one or more of Aspects 15 through 19.

Aspect 27: An apparatus for wireless communication, comprising at least one means for performing the method of one or more of Aspects 15 through 19.

Aspect 28: A non-transitory computer-readable medium storing code for wireless communication, the code comprising instructions executable by a processor to perform the method of one or more of Aspects 15 through 19.

Aspect 29: A non-transitory computer-readable medium storing a set of instructions for wireless communication, the set of instructions comprising one or more instructions that, when executed by one or more processors of a device, cause the device to perform the method of one or more of Aspects 15 through 19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, from a network node, scheduling information, the scheduling information comprising a single payload size and scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications;
        receive, from the network node, configuration information indicating that, when the scheduling information schedules a sidelink communication, one or more fields associated with a downlink control information (DCI) format for which the scheduling information is configured are re-purposed to indicate a parameter associated with a sidelink configuration; and
        communicate the one or more communications based at least in part on the one or more of the transmission parameter or the reception parameter.

2. The UE of claim 1, wherein the scheduling information includes a plurality of bits corresponding to a DCI format identifier.

3. The UE of claim 2, wherein the plurality of bits are set to:
a first value to indicate that the one or more communications are scheduled over the uplink,
a second value to indicate that the one or more communications are scheduled over the downlink,
a third value to indicate that the one or more communications are scheduled over the sidelink,
a fourth value to indicate that a first communication of the one or more communications is scheduled over the uplink and a second communication of the one or more communications is scheduled over the sidelink, or
a fifth value to indicate that the first communication is scheduled over the downlink and the second communication is scheduled over the sidelink.

4. The UE of claim 3, wherein the plurality of bits are set to the fourth value or the fifth value, and wherein the scheduling information indicates one or more of a time division multiplexing configuration, a frequency division multiplexing configuration, or a spatial division multiplexing configuration.

5. The UE of claim 1, wherein the one or more processors are further configured to:
receive an indication that one or more of a time domain resource allocation or a frequency domain allocation follows a first allocation procedure or a second allocation procedure, wherein the first allocation procedure is associated with allocating access link resources and the second allocation procedure is associated with allocating sidelink resources.

6. The UE of claim 5, wherein the indication that the one or more of the time domain resource allocation or the frequency domain allocation follows the first allocation procedure or the second allocation procedure is received via radio resource control (RRC) signaling.

7. The UE of claim 1, wherein the scheduling information comprises a cyclic redundancy check (CRC) value scrambled by a radio network temporary identifier (RNTI), wherein the RNTI used to scramble the CRC value indicates that the scheduling information is associated with scheduling the one or more communications over the one or more of the sidelink, the uplink, or the downlink.

8. The UE of claim 1, wherein the scheduling information indicates that the one or more communications are scheduled over the sidelink, and wherein a precoding matrix indicator (PMI) field indicates a physical uplink control channel (PUCCH) resource indicator associated with transmitting sidelink feedback information, a sidelink resource pool, a sidelink assignment index (SAI), a configuration index, PUCCH feedback timing, or a UE identifier.

9. The UE of claim 1, wherein the scheduling information indicates that the one or more communications are scheduled over the sidelink, and wherein an uplink shared channel indicator indicates a physical uplink control channel (PUCCH) resource indicator associated with transmitting sidelink feedback information, a sidelink resource pool, a sidelink assignment index (SAI), a configuration index, PUCCH feedback timing, or a UE identifier.

10. The UE of claim 1, wherein the scheduling information is included in DCI that is associated with a DCI format identifier, and wherein the DCI format identifier indicates:
a first DCI format based at least in part on the one or more communications comprising an uplink communication,
a second DCI format based at least in part on the one or more communications comprising a downlink communication,
a third DCI format based at least in part on the one or more communications comprising a sidelink transmission,
a fourth DCI format based at least in part on the one or more communications comprising a sidelink reception,
a fifth DCI format based at least in part on the one or more communications comprising the sidelink transmission and the sidelink reception,
a sixth DCI format based at least in part on the one or more communications comprising the uplink communication and the sidelink transmission, or
a seventh DCI format based at least in part on the one or more communications comprising the downlink communication and the sidelink reception.

11. The UE of claim 10, wherein the DCI format identifier indicates the third DCI format, and wherein the DCI indicates a receiving device associated with the sidelink transmission.

12. The UE of claim 10, wherein the DCI format identifier indicates the fourth DCI format, and wherein the DCI indicates a transmitting device associated with the sidelink reception.

13. The UE of claim 10, wherein the DCI format identifier indicates the fifth DCI format, and wherein the DCI indicates a transmitting device associated with the sidelink reception and a receiving device associated with the sidelink transmission.

14. The UE of claim 10, wherein the UE is configured to operate in a full-duplex mode or a frequency division duplexing mode, and wherein the DCI format identifier indicates:
an eighth DCI format based at least in part on the one or more communications comprising the uplink communication and the downlink communication, or
a ninth DCI format based at least in part on the one or more communications including the sidelink transmission and the sidelink reception.

15. A network node for wireless communication, comprising:
a memory; and
one or more processors, coupled to the memory, configured to:
transmit scheduling information, the scheduling information comprising a single payload size and scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications;
transmit, to a first user equipment (UE), configuration information indicating that, when the scheduling information schedules a sidelink communication, one or more fields associated with a downlink control information (DCI) format for which the scheduling information is configured are re-purposed to indicate a parameter associated with a sidelink configuration; and
communicate the one or more communications based at least in part on the one or more of the transmission parameters or the reception parameters.

16. The network node of claim 15, wherein the one or more processors are further configured to:
transmit a first configuration to the first UE, wherein the first configuration indicates that the indicator corresponds to the one or more communications being scheduled over the uplink; and transmit a second configuration to a second UE, wherein the second configuration indicates that the indicator corresponds to the one or more communications being scheduled over the downlink, wherein the scheduling information is transmitted to the first UE to schedule uplink resources for the first UE, and wherein the scheduling information is transmitted to the second UE to schedule downlink resources for the second UE.

17. The network node of claim 16, wherein the one or more processors are further configured to:

receive an indication that the first UE includes a capability associated with a scheduling mode, wherein the first configuration is transmitted to the first UE based at least in part on the first UE including the capability associated with the scheduling mode.

18. The network node of claim 16, wherein the first UE and the second UE are associated with one or more of a same search space configuration, a same sidelink radio network temporary identifier (RNTI), or a same sidelink configured scheduling RNTI.

19. The network node of claim 16, wherein the scheduling information indicates a receiving device or a transmitting device associated with the one or more communications.

20. A method of wireless communication performed by a user equipment (UE), comprising:

receiving, from a network node, scheduling information, the scheduling information comprising a single payload size and scheduling one or more communications, wherein the one or more communications are scheduled over one or more of a sidelink, an uplink, or a downlink, and wherein the scheduling information provides one or more of a transmission parameter for the one or more communications or a reception parameter for the one or more communications;

receiving, from the network node, configuration information indicating that, when the scheduling information schedules a sidelink communication, one or more fields associated with a downlink control information (DCI) format for which the scheduling information is configured are re-purposed to indicate a parameter associated with a sidelink configuration; and communicating the one or more communications based at least in part on the one or more of the transmission parameter or the reception parameter.

21. The method of claim 20, wherein the scheduling information includes a plurality of bits corresponding to a DCI format identifier.

22. The method of claim 21, wherein the plurality of bits are set to:

a first value to indicate that the one or more communications are scheduled over the uplink, a second value to indicate that the one or more communications are scheduled over the downlink, a third value to indicate that the one or more communications are scheduled over the sidelink, a fourth value to indicate that a first communication of the one or more communications is scheduled over the uplink and a second communication of the one or more communications is scheduled over the sidelink, or a fifth value to indicate that the first communication is scheduled over the downlink and the second communication is scheduled over the sidelink.

23. The method of claim 22, wherein the plurality of bits are set to the fourth value or the fifth value, and wherein the scheduling information indicates one or more of a time division multiplexing configuration, a frequency division multiplexing configuration, or a spatial division multiplexing configuration.

24. The method of claim 20, further comprising:

receiving, via radio resource control (RRC) signaling, an indication that one or more of a time domain resource allocation or a frequency domain allocation follows a first allocation procedure or a second allocation procedure, wherein the first allocation procedure is associated with allocating access link resources and the second allocation procedure is associated with allocating sidelink resources.

25. The method of claim 20, wherein the scheduling information is included in DCI that is associated with a DCI format identifier, and wherein the DCI format identifier indicates:

a first DCI format based at least in part on the one or more communications comprising an uplink communication, a second DCI format based at least in part on the one or more communications comprising a downlink communication, a third DCI format based at least in part on the one or more communications comprising a sidelink transmission, a fourth DCI format based at least in part on the one or more communications comprising a sidelink reception, a fifth DCI format based at least in part on the one or more communications comprising the sidelink transmission and the sidelink reception, a sixth DCI format based at least in part on the one or more communications comprising the uplink communication and the sidelink transmission, or a seventh DCI format based at least in part on the one or more communications comprising the downlink communication and the sidelink reception.

26. A method of wireless communication performed by a network node, comprising:

transmitting scheduling information, the scheduling information comprising a single payload size and scheduling one or more communications, wherein the scheduling information includes an indicator indicating that the one or more communications are scheduled over one or more of a sidelink, an uplink, or a downlink, and wherein the scheduling information provides one or more of transmission parameters for the one or more communications or reception parameters for the one or more communications;

transmitting, to a first user equipment (UE), configuration information indicating that, when the scheduling information schedules a sidelink communication, one or more fields associated with a downlink control information (DCI) format for which the scheduling information is configured are re-purposed to indicate a parameter associated with a sidelink configuration; and communicating the one or more communications based at least in part on the one or more of the transmission parameters or the reception parameters.

27. The method of claim 26, further comprising:

transmitting a first configuration to the first UE, wherein the first configuration indicates that the indicator corresponds to the one or more communications being scheduled over the uplink; and transmitting a second configuration to a second UE, wherein the second configuration indicates that the indicator corresponds to the one or more communications being scheduled over the downlink, wherein the scheduling information is transmitted to the first UE to schedule uplink resources for the first UE, and wherein the scheduling information is transmitted to the second UE to schedule downlink resources for the second UE.

28. The method of claim 27, further comprising:
receiving an indication that the first UE includes a capability associated with a scheduling mode, wherein the first configuration is transmitted to the first UE based at least in part on the first UE including the capability associated with the scheduling mode.

29. The method of claim 27, wherein the first UE and the second UE are associated with one or more of a same search space configuration, a same sidelink radio network temporary identifier (RNTI), or a same sidelink configured scheduling RNTI.

30. The method of claim 27, wherein the scheduling information indicates a receiving device or a transmitting device associated with the one or more communications.

* * * * *